United States Patent [19]

Sieradzki et al.

[11] Patent Number: 4,679,447
[45] Date of Patent: Jul. 14, 1987

[54] METHOD AND APPARATUS FOR POSITIONING AND TESTING RAILROAD WHEELS

[75] Inventors: Christopher Sieradzki, Homewood; Lyman W. Jeffreys, Barrington, both of Ill.

[73] Assignee: Amsted Industries Incorporated, Chicago, Ill.

[21] Appl. No.: 817,921

[22] Filed: Jan. 13, 1986

[51] Int. Cl.[4] .................... G01M 19/00; G01N 11/00; G01N 11/30; G01N 11/24
[52] U.S. Cl. .................. 73/865.8; 73/865.9; 33/550; 33/203; 356/376
[58] Field of Search ............ 73/432 V, 432 R, 432 G, 73/432 GM, 146, 104, 432.1, 865, 865.8, 865.9; 33/550, 533, 573, 203, 203.12, 203.15; 356/376, 386, 387

[56] References Cited

U.S. PATENT DOCUMENTS

| | | | |
|---|---|---|---|
| 3,604,940 | 9/1971 | Matthews | 356/386 |
| 3,907,438 | 9/1975 | Holemon | 356/376 |
| 3,966,330 | 6/1970 | Ridler et al. | 356/386 |
| 4,233,745 | 11/1980 | Ramon et al. | 33/533 X |
| 4,386,469 | 6/1983 | Lopsker | 33/550 X |
| 4,531,625 | 7/1985 | Yonekura | 356/386 X |
| 4,538,357 | 9/1985 | Dressel et al. | 33/203.18 |

FOREIGN PATENT DOCUMENTS 98602  8/1978  Japan ........................ 73/7

Primary Examiner—Tom Noland
Attorney, Agent, or Firm—Edward J. Brosius; Charles E. Bouton

[57] ABSTRACT

Method and apparatus for gauging railroad wheels for warpage and rotundity and tape size wherein each wheel is received in an upright posture, where it is weighed, and then turned and lowered to rest horizontally on cushioned rotatable supports where it is gauged while being rotated about its axis by projecting light across its surfaces.

20 Claims, 5 Drawing Figures

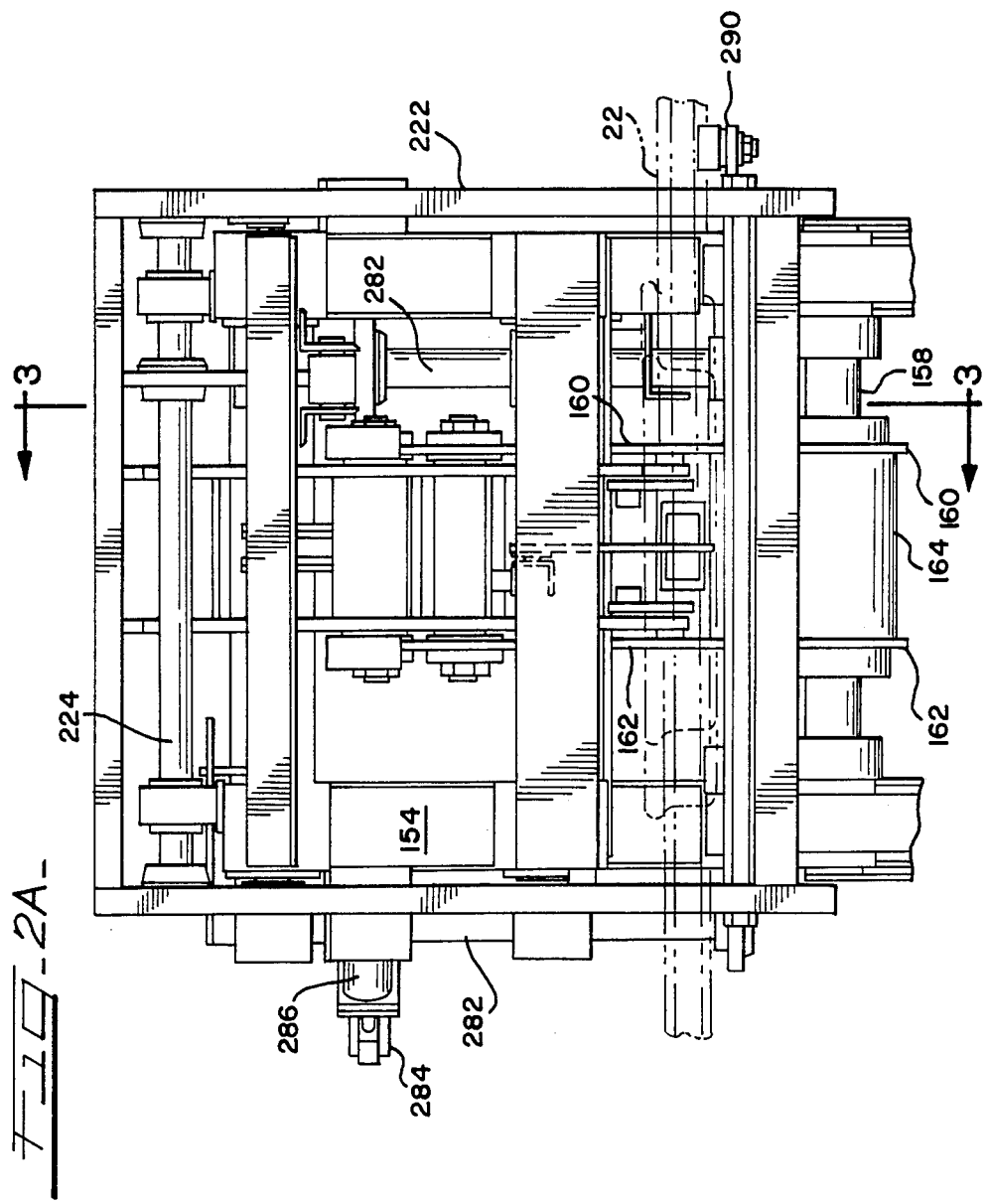

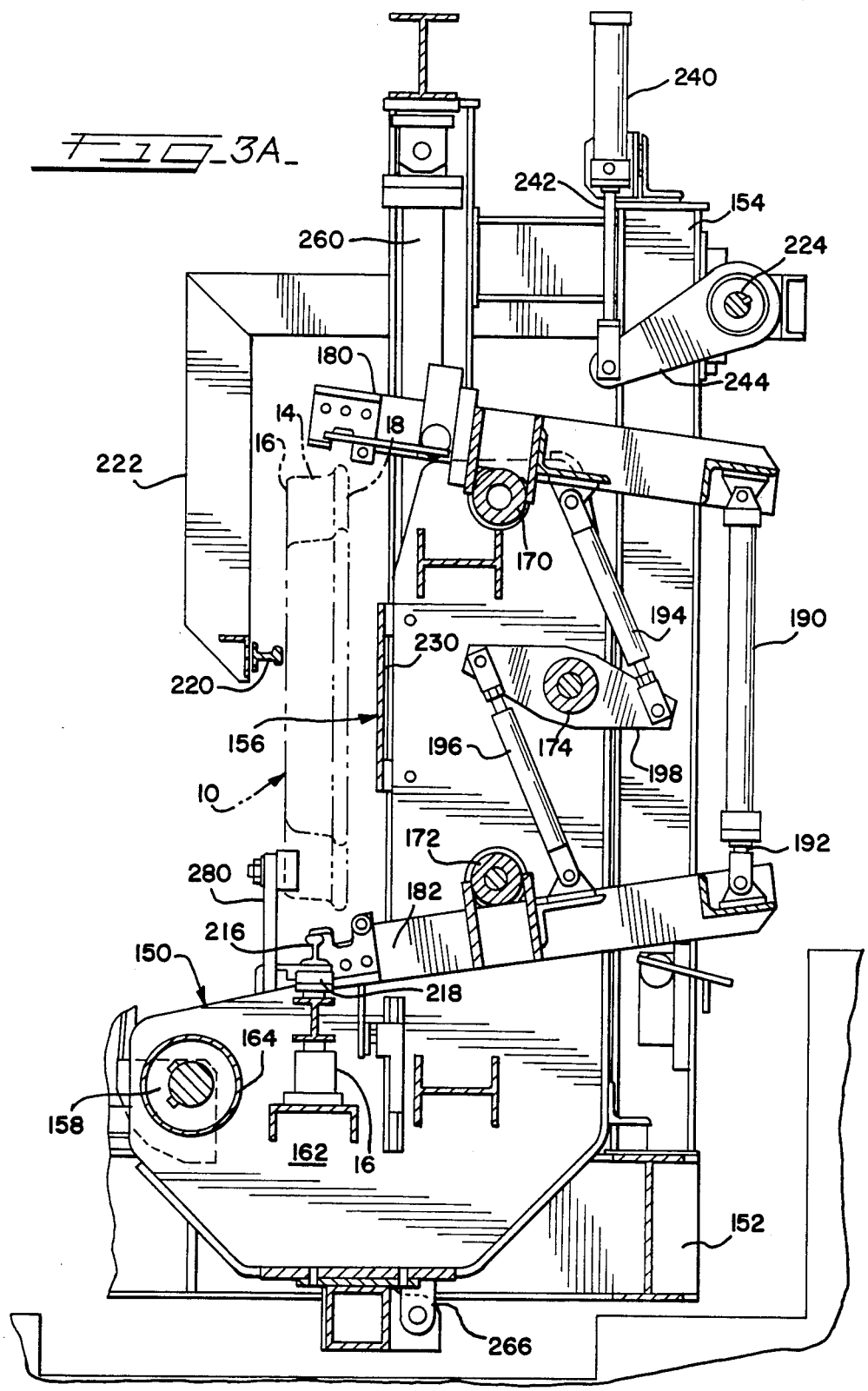

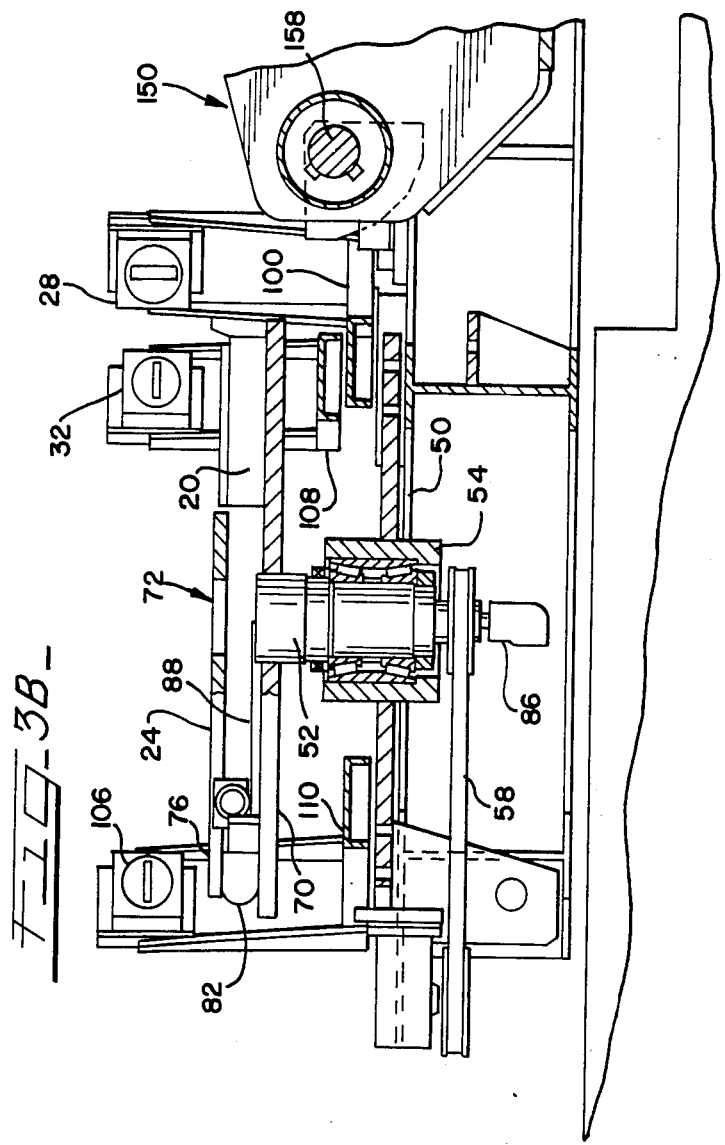

METHOD AND APPARATUS FOR POSITIONING AND TESTING RAILROAD WHEELS

This invention pertains to the manufacture of railroad wheels; and more particularly involves a method and apparatus for positioning and testing railroad wheels for warpage, tape size, weight and rotundity.

BACKGROUND OF THE INVENTION AND PRIOR ART

Railroad wheels are cast of molten iron or steel in molds and removed therefrom when the metal solidifies but remains hot. The wheels are then heat treated, allowed to cool and inventoried for final machining of an axle hole and delivery to customers for mounting of matched pairs of wheels on axles and car trucks.

The molding process is accurate but does not produce wheels of precisely the same dimensions; and during the molding and heat treating it is possible that a wheel may warp to a degree that will cause it to be unfit for certain types of service or to be scrapped.

Thus before the axle holes are machine finished it is necessary to inspect and test each wheel or warpage, tape size, weight and roundness. (Tape size is an American Association of Railroad Standard of Measuring and Specifying Wheel Circumference.) Heretofore warpage has been checked by laying the wheel on a work surface and lowering a multiple sensor gauging device onto the wheel as shown in U.S. Pat. No. 4,233,745. In another separate prior unit for testing rotundity a device has then been manually rotated around the rim of the wheel as disclosed in U.S. Pat. No. 4,538,357. The procedure has been labor intensive; and gauge movement has risked damage and endangered accuracy. Moreover the wheels are very heavy and have been lifted and moved into and out of position by an overhead hoist or the like.

OBJECTS AND SUMMARY OF THE INVENTION

Therefore a principal object of the present invention is to automate the positioning and testing of railroad wheels.

Another object of the present invention is to provide an improved method and apparatus for positioning and testing railroad wheels for warpage tape size, weight, and/or rotundity.

A further object of the present invention is to provide an improved method and apparatus for moving railroad wheels into position for testing. Yet another object of the present invention is to provide an improved method and apparatus for testing railroad wheels for warpage.

Still another object of the present invention is to provide an improved method and apparatus for testing railroad wheel for rotundity.

A further object of the present invention is to provide an improved method and apparatus for testing railroad wheels for tape size.

It is also an object of the present invention to provide an improved method and apparatus for measuring the weight of railroad wheels.

Briefly stated the present invention involves rolling a wheel into a first vertical position where it may be weighed, gripping the wheel and centering it with respect to a positioning means and then swinging the wheel 90° and accurately laying it on a horizontal receiving means.

Thereafter the wheel is lowered onto a plane support and the wheel is rotated thereon while gauging a horizontal surface for warpage and also gauging the rim or the wheel for tape size and rotundity or deviation therefrom.

The apparatus for performing these functions include wheel delivery means, gripping and centering means which is mounted on swingable positioning means to move and lay-down a wheel from a vertical posture at the delivery means to a horizontal posture at a receiving means which is vertically reciprocable with respect to a plane support means which is rotatable about a central vertical axis, with warpage gauging means, tape size gauging means and rotundity gauging means mounted adjacent the plane support means and weighing means located at the delivery means.

Further objects and advantages will become apparent from the following detailed description taken in conjunction with the drawings wherein.

BRIEF DESCRIPTION OF THE DRAWINGS

FIG. 2A is a plan view of the wheel lay-down apparatus portion of the invention of FIG. 1.

FIG. 3A is a side elevation in partial section of the apparatus shown in FIG. 2A taken at line 3—3 therein; and FIG. 3B is a side elevation is partial section of the apparatus shown in FIG. 2B taken at line 3—3 therein.

DETAILED DESCRIPTION

Figure 1:
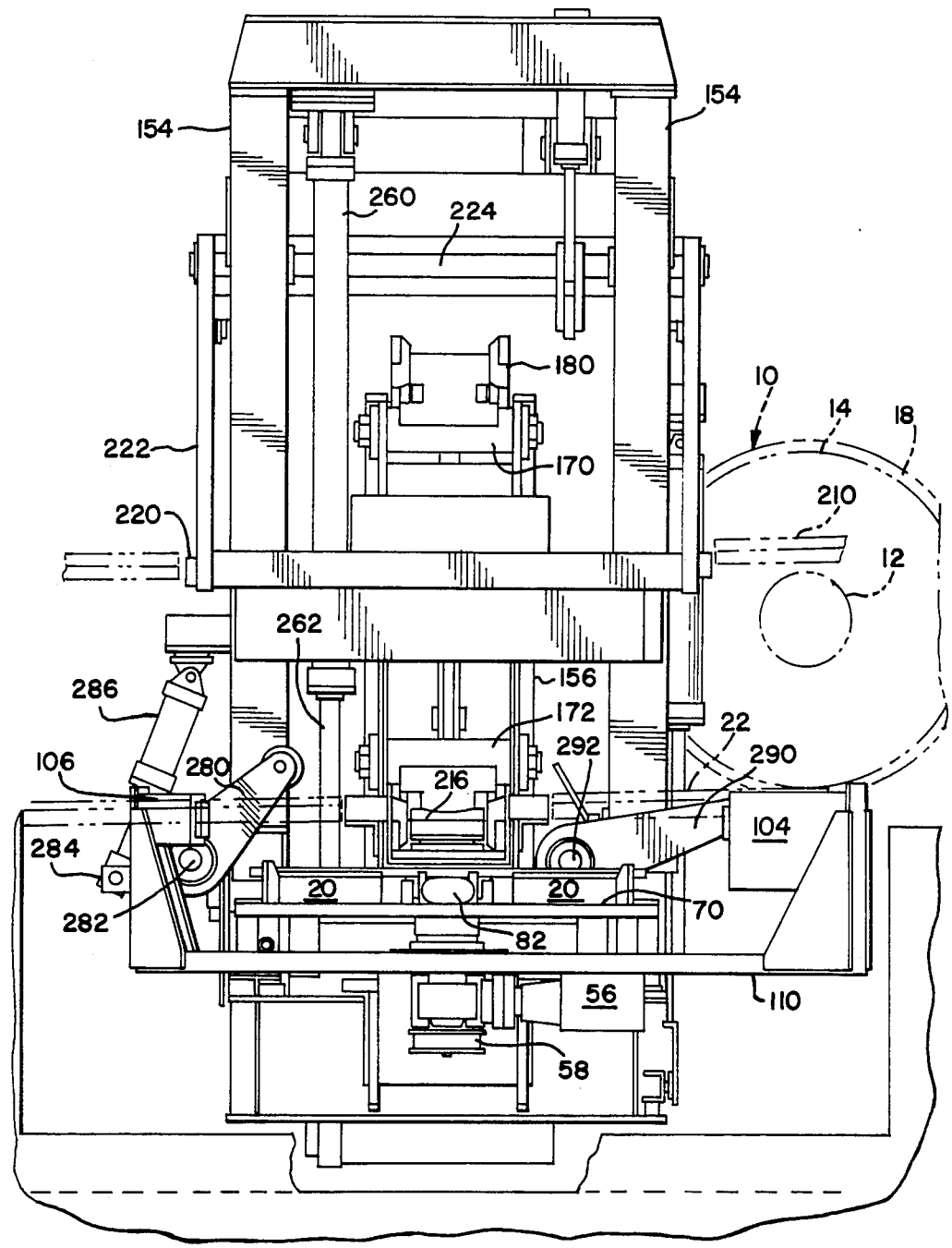
FIG. 1 is a front elevation view of the present invention including wheel lay-down apparatus and wheel testing apparatus but with certain parts removed for clarity.

According to the present invention a wheel 10, such as a steel railway wheel having an axle hole 12, outer rim 14 rim edge and opposing flange 18, is examined for warpage (deviation from a plane) and rotundity (deviation from a perfect circle), without the influence of variations in an unfinished axle hole 12, by laying the wheel substantially horizontally with the rim edge resting upon multiple gage blocks 20 which establish given plane, rotating the blocks and wheel about a central vertical axis perpendicular to said given plane and examining the upper flange surface of the wheel for deviation from a reference level. At the same time the vertically disposed peripherial rim 14 may similarly be examined for deviation from a reference point. Preferably the rim 14 is simultaneously examined at two diametrically opposed (or radially separated) points on its tread, and variation in the distance between the two points (as the wheel rotates) is measured to determine the relative degree to which the rim may be out of round. These measurements are continuously fed into a computer processor which is programmed to automatically calculate diameters; and tape size is determined by measuring diameters of the wheel about 360° of rotating, and solving the following equation in the processor:

$$\frac{(DIA. \text{ average} \times \pi) - 84}{.125} = \text{TAPE SIZE}$$

The wheel is normally first received in an upright attitude rolling on a delivery rail 22 to a first position adjacent and to one side of the gage blocks 20 with the flange surface disposed away from the blocks. Preferably a load cell 16 is located at the first position to support and weigh the wheel 10. The wheel flange 18 is then gripped at upper and lower portions of the flange and lifted to an interim position with the axle hole 12 and wheel center at a given level. The wheel 10 is then bodily swung, while gripped, from the upright attitude to a horizontal attitude at a second position directly above the gauging blocks where it is received upon a cushioned receiving means 24. From the second position, the wheel is lowered by the cushioned receiving means 24 to a third position with the rim edge directly upon support means comprising the nine gage blocks 20 thereby establishing a plane of reference for the wheel. Preferably the receiving means is then lowered further or otherwise removed from supporting contact with the wheel 10.

The wheel 10 and gage blocks 20 are then rotated about a substantially vertical axis perpendicular to the plane of reference and substantially central of the wheel and blocks whereby any warpage (deviation of the back side of the wheel flange 18 from a plane parallel to the reference plane) may be examined and will be detectable as a vertical raising or lowering of the flange profile at one or more locations.

Such warpage (vertical deviation) is preferably measured by a first horizontal laser beam spread as a vertical sheet of light from a transmitter 26 to a receiver 28 positioned at opposite sides of the wheel 10 in such a way that the warpage, if any, will cause the sheet of laser light on the receiver 28 to increase and/or decrease as the wheel 10 is rotated. Thus, the laser light falling on the receiver 28 will generate a signal that may be amplified and analyzed, as by computer, to determine whether the degree of warpage is acceptable or not.

The aforementioned laser beam may also be adjusted vertically to check the co-planer aspect of all of the top surfaces of gage blocks 20; and also may be calibrated to measure the rim thickness of a wheel 10 placed upon the gage blocks 20.

It will be apparent that the warpage and subsequently described examinations may also be made by rotating the laser beam about a stationary wheel.

At the same time the wheel 10 is preferably also examined for rotundity by detecting variations in the horizontal position of the rim 14 profile at one or more locations. This examination is facilitated by use of similar second horizontal laser beam disposed to spread the laser as a horizontal sheet of light from a transmitter 30 to an oppositely positional receiver 32. Preferably a pair of such second laser beams are employed across diametrically opposite portions of the rim 14 so that increase and/or decreases in the two horizontal sheets of light may be amplified and analyzed as variations in the diameter of the wheel at successive cross-sections, and without reference to the wheel center, to determine whether the degree of variation, if any, is acceptable or not.

A third examination may also be made by the second horizontal lasers by averaging the successive diameter measurements and computing wheel tape size (which is the circumference of the wheel rim at a particular point on the wheel tread). This measure of tape size is then recorded for the wheel 10 and is useful in subsequently matching pairs of wheels on a given axle where it is important that the wheels be of the same tape size (circumference).

When the examinations are complete, the rotation is stopped and the wheel removed by raising the cushioned support means 24 to elevate the wheel 10 above the gage blocks 20 to the aforementioned second position; and the wheel is then gripped and returned to the first position and exited from the test zone.

An apparatus devised to carry out the foregoing method comprises a first horizontal frame 50 supporting a vertical shaft 52 rotatably mounted in a bearing 54. An electric motor 56 mounted on the first frame to one side of the shaft 52 is connected by drive belt 58 to rotate shaft 52.

Figure 2B:
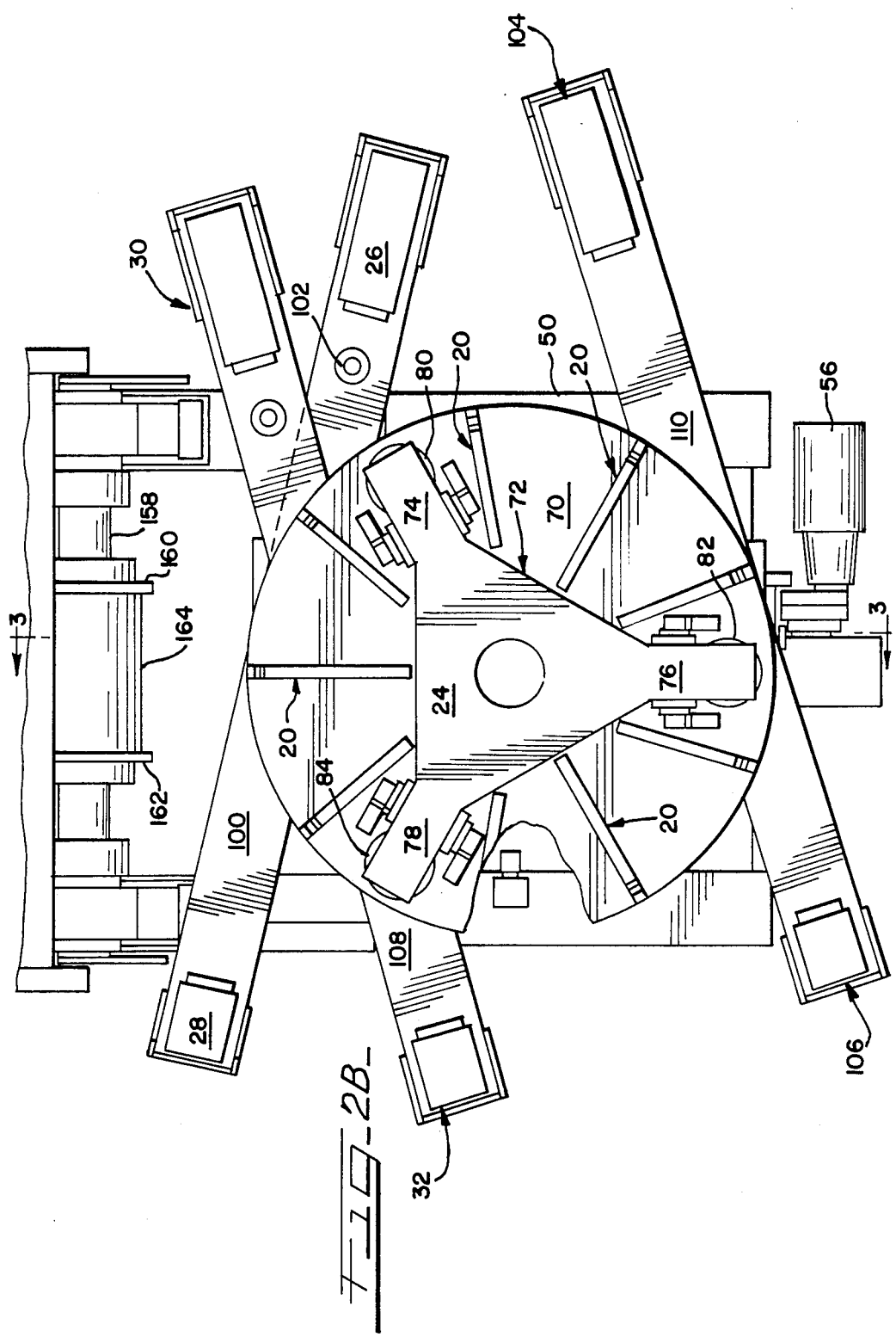
FIG. 2B is a plan view of the wheel testing apparatus portion of the invention of FIG. 1.

A rotary platform 70, preferably circular (as seen from above in FIG. 2B) is fixed to the shaft 52 above the first frame 50 and in turn supports nine gage blocks 20 radially and angularly equidistant with respect to the shaft 52. The gage blocks 20 are slender rectangular forms accurately machined to provide flat upper surfaces and are of sufficient length radially to accommodate a full range of wheel sizes (which normally range between 28 to 42 inches (71.12 to 106.68 cm.) in rim diameter for railway wheel). The upper surfaces of the three gage blocks 20 will establish a specific reference plane for any object, such as a wheel 10, placed thereon.

Since the upper surfaces of gage blocks 20 establish a reference plane, it is important that the successive wheels being examined, which may weigh up to 1200 pounds (543.6 kg.) each, be gently set upon them. Accordingly, the rotary platform 70 holds a cushioned support means 24 vertically movable between levels below and above the upper surfaces of gage blocks 20. A preferred form of such support means is a three arm spider generally 72, the arms 74, 76 and 78 of which extend radially between the gage blocks 20 and at their outer ends rest upon an equal number of fluid extendible members such as pneumatic springs 80, 82 and 84 seated upon the rotary platform 70. Suitable conduits (88) extend from each pneumatic spring through the vertical shaft 52 to a rotary union 86 and thence connected to solenoid operated valves and sources of pressurized air (not shown) which control the inflation and deflation of the pneumatic springs.

A first subframe 100 is pivotally secured to the first horizontal frame 50 upon a thrust bearing 102 so as to be positionable chord-like beneath the rotary platform 70. The first subframe 100 extends beyond the rotary platform in two directions and at the opposite ends thereof are mounted a first laser transmitter 26 and first laser receiver 28. The transmitter and receiver are positioned above the first subframe 100 at a level slightly above the top surface of gage blocks 20, and the transmitter 26 emits a vertical sheet of light in a horizontal direction that is to be partially intercepted by the flange 18 of wheel 10 when in place on the gage blocks 20. By pivoting the first subframe 100, this first laser light beam may be adjusted with respect to the size of wheel being examined.

The laser transmitter and receiver equipment is commercially available from a number of sources, one being the Techmet Company of Dayton, Ohio.

A second laser transmitter 30 and second receiver 32 may be mounted on the same subframe 100 below the first transmitter 26 and receiver 28 or preferably on a separate pivotable subframe 108, as shown in the Figures, to emit and receive a second horizontal laser light beam in the form of a horizontal sheet that will be partially intercepted by the rim 14 of wheel 10. Similarly a third laser transmitter 104 for emitting a third beam in the form of a horizontal sheet of light and third receiver 106 are mounted on a third subframe 110 which is linked by cross members (not shown) to the subframe 108 so as to remain parallel thereto. However the cross members are pivotable and thereby permit the distance between the aforementioned subframes 108 and 110 to be adjusted so that both the second and third laser beams (both in the form of horizontal sheets of light) are partially intercepted by diametrically opposite portions of a wheel rim 14. Thereby the second and third receivers 32 and 106 may be calibrated to measure the diameter of the wheel 10 at successive angular cross-sections without reference to the true center of the wheel.

A wheel turning and lay-down apparatus generally 150 is located adjacent the first horizontal frame 50 so as to accurately position and gently place successive wheels 10 on the cushioned support means 24 for examination. This includes a second horizontal frame 152, a superstructure generally 154 and swingable frame generally 156 pivotally mounted upon a shaft 158 mounted on the second horizontal frame 152 whereby the swingable frame 156 is movable between an upright posture within the superstructure and to a horizontal posture above the first horizontal frame 50 and rotary platform 70.

The swingable frame generally 156 is comprised of a pair of L shaped panels 160, 162 each secured at the foot of the "L" to a sleeve 164 concentrically mounted on the shaft 158 which is rotatably mounted in bearings on the frame 152. The upright portion of the "L" panels 160, 162 are connected by three shafts 170, 172, 174 which operatively support and control bifurcated upper and lower gripper jaws generally 180 and 182. As may be seen in FIG. 3A the upper gripper jaw 180 is rockingly supported on upper shaft 170 between the "L" panel 160, 162; and similarly lower gripper jaw 182 is rockingly supported by lower shaft 172. At the forward ends (toward the left in FIG. 3A) each of the jaws 180 and 182 are notched to receive the flange 18 of a wheel 10 which is delivered unto the lower jaw 182 from delivery rail 22. at the opposite ends the jAws 180, 182 are interconnected by a fluid cylinder 190, preferably hydraulic, and reciprocable shaft 192 which is operable to rock the two jaws about the respective shafts 170, 172 so as to grip a wheel 10 by its flange 18 at top and bottom points thereon. Operation of fluid cylinder 190 to extend shaft 192 will cause lower jaw 182 to lift a wheel 10 until firmly gripped by the upper jaw 182. a pair of equal length equalizer struts 194, 196 mounted between the respective jaws 180, 182, from points rearward of shafts 170, 172 and opposite ends of a rocker arm 198 pivotally mounted on the shaft 174 function to maintain symmetrical positioning of the jaws 180, 182. Thus, the center of each wheel 10 will be held at about the same level, with respect to the swingable frame generally 156, when gripped and held by both jaws 180, 182. (Alternatively a system of gears may be substituted for the equalizer struts and rocker arm.)

The wheel 10 is held upright as it is rolled along delivery rail 22 by an auxiliary rail 210 spaced above and parallel to rail 22. Both rails 22 and 210 are discontinuous, with delivery rail 22 interrupted across the width of lower jaw 182 and auxiliary rail 210 interrupted across the width of the superstructure 154. Between the entry and exit portions of the delivery rail 22 there is a narrow rail segment 216 seated on a cushion 218 of polyurethane or similar material secured between the "L" panels 160, 162 and positioned to receive the rim 14 of a wheel 10 while leaving the flange 18 clear so as to roll into the notches on the lower jaw 182. The load cell 16 is also positioned under this location to weigh a wheel when resting on rail segment 216. A horizontal stabilizing rail segment 220, substantially aligned with the auxiliary rail 210, is held for substantially reciprocable movement within the superstructure by a yoke 222 that passes to either side of swingable frame 156 and is secured to a horizontal pivot shaft 224 above the swingable frame generally 156. The stabilizing rail segment 220 is movable to hold a wheel 10 on the narrow rail segment 216 upright with the hub thereof urged against a buffer plate 230 secured to the forward edges of the upright portions of "L" panels 160, 162. The stabilizing rail segment 220 may be swung forward and upward so as to be clear of the wheel 10 and swingable frame generally 156 by a fluid cylinder 240 (preferably an air cylinder for quick action) and operating rod 242 which is connected by a crank arm 244 to the pivot shaft 224 whereby the yoke 222 is moved.

A power cylinder 260 and shaft 262 (preferably hydraulic) is connected between the superstructure 154 and a clevis 266 at the bottom of the foot of "L" panel 160. Actuation of cylinder 260 will swing the swingable frame generally 156 about shaft 158 and thereby carry a wheel 10 held between jaws 180, 182 from an upright, vertical posture to a horizontal posture directly above the spider 72 of the cushioned support means 24.

The apparatus also includes wheel discharge means in the form of a pivotable stop arm 280 adjacent the exit portion of rail 22, which arm 280 is fastened to a shaft 282 that is oscillated by a crank 284 and quick action air cylinder 286. When the stop arm 280 is moved to a raised position (as shown in FIG. 1), it blocks movement of a wheel off of the rail segment 216. When stop arm 280 is lowered, the wheel will be free to exit upon being pushed off rail segment 216 by the next wheel to be delivered thereto.

Delivery of wheels 10 is, in turn, controlled by another stop or kicker arm 290 similarly fastened to a stub shaft 292 and located adjacent the entry side of rail 22. The kicker arm 290 is moved between raised and lowered positions by an air cylinder and crank (not shown in the drawings) connected to the shaft 292 so as to block or permit passage of a wheel onto the rail segment 216.

The foregoing apparatus may be operated in proper sequence by a human operator upon visual observation of the various movements and also by any of various automatic means well known in the engineering arts to detect movements and initiate events according to a programmed sequence.

It is to be understood that the foregoing description is of a preferred embodiment for carrying out the invention and does not constitute the measure of the invention defined in the following claims.

What is claimed is:

1. An improved method for positioning and testing railroad wheels, said method comprising:
   moving a wheel to a first position with the wheel positioned upright in a vertical posture;
   gripping the wheel about its rim and flange;
   swinging the wheel about a spaced axis from said vertical posture to a substantially horizontal posture at a second position;
   receiving said wheel in said horizontal posture upon a horizontal receiving means at said second position;
   lowering said wheel and receiving means to a third position below said second position with said wheel resting upon a plurality of support means defining a horizontal plane;

rotating said support means and wheel about a vertical axis substantially central of said wheel; and gauging at least one of the upper surface and the rim surface of said wheel for warpage and rotundity respectively while being rotated.

2. The method of claim 1 wherein the wheel is weighed at said first position.

3. The method of claim 1 wherein the gauging of the wheel includes tape size.

4. The method of claim 1 wherein the wheel is located and centered at an interim position between said first position and said second position so as to align the axis of said wheel and the vertical axis of said support means when said wheel is swung to said second position.

5. The method of claim 1 wherein said receiving means is lowered beneath said third position before rotating said support means and said wheel.

6. The method of claim 1 wherein the gauging of at least one of said upper surface and rim surface of said wheel is performed by projecting a sheet of light in a plane normal to the surface being gauged and sensing variations in the sheet of light during rotation of said wheel.

7. The method of claim 6 wherein at least one thin sheet of light is projected from one location at one side of said wheel across at least one of the upper surface and rim surface.

8. The method of claim 7 wherein more than one thin sheet of light is projected across the wheel rim surface so as to gauge the wheel for rotundity and tape size.

9. An improved apparatus for positioning and testing railroad wheels said apparatus comprising;

means to move a wheel to a first position with the wheel positioned upright in a vertical posture;

gripping means to engage the wheel by its rim and flange;

swinging means to pivot the gripping means and wheel engaged thereby about a spaced axis from said vertical posture to a substantially horizontal posture;

horizontal receiving means for receiving and supporting said wheel at a second position, said receiving means being vertically movable between said second position and a third position spaced therebeneath;

supporting means between said second and third positions, said supporting means comprising a plurality of blocks defining a horizontal plane;

rotating means connected to rotate said supporting means about a vertical axis substantially central of said blocks and gauging means located adjacent said supporting means for detecting variations in at least one of the upper surface and rim surface of said wheel while being rotated on said support means.

10. The apparatus of claim 9 including lifting means attached to said gripping means to raise the wheel and center it at an interim position so as to be aligned with said vertical axis when said wheel is swung to said second position.

11. The apparatus of claim 9 including vertically reciprocable means connected to raise and lower said receiving means between said second position and said third position.

12. The apparatus of claim 9 including wheel weighing means located at said first position.

13. The apparatus of claim 9 wherein said gauging means comprises a light source for projecting a sheet of light in a plane normal to at least one of said upper surface and said rim surface, said sheet of light extending chord-like across said wheel from one side thereof to a substantially opposite side and a light sensing means at said opposite side to detect variations in the sheet of light during rotation of said wheel.

14. The apparatus of claim 13 including means to record said variations of the light at said sensing means.

15. The apparatus of claim 14 including at least a pair of each of said light source and sensing means mounted to project and receive parallel sheets of light across said rim surface.

16. The apparatus of claim 9 including a vertically movable spider having arms extending between said blocks, said spider being vertically reciprocable between positions above and below the plane defining surfaces of said blocks whereby to move a wheel, onto and off of said blocks.

17. The apparatus of claim 16 wherein said rotating means comprises a rotatable platform, said apparatus further including fluid extendible members connected between said rotatable platform and each of said spider arms; and conduits connectable between said extendible members and a source of fluid under pressure.

18. The apparatus of claim 9 wherein said supporting means comprise a plurality of blocks defining a horizontal plane, said blocks resting on a rotary platform which is rotatable about a vertical axis central of said blocks.

19. The apparatus of claim 19 wherein said receiving means is a vertically movable spider having arms extending between said blocks, said spider being vertically reciprocable between positions above and below the plane defining surfaces of said blocks whereby to move a wheel onto and off of said blocks.

20. The apparatus of claim 18 including fluid extendible members connected between said rotatable platform and each of said spider arms; and conduits connectable between said extendible members and a source of fluid under pressure.

* * * * *